(12) United States Patent  
Jani et al.

(10) Patent No.: US 9,742,616 B2
(45) Date of Patent: Aug. 22, 2017

(54) DEVICE FOR INDICATING PACKET PROCESSING HINTS

(71) Applicant: Intel Corporation, Santa Clara, CA (US)

(72) Inventors: Nrupal Jani, Hillsboro, OR (US); Ilango Ganga, Cupertino, CA (US); Daniel Daly, Ann Arbor, MI (US); John Fastabend, Hillsboro, OR (US); Neerav Parikh, Hillsboro, OR (US); Elizabeth Kappler, Hillsboro, OR (US); Brian J. Skerry, Gilbert, AZ (US); Calin Gherghe, Hillsboro, OR (US); Sanjeev Jain, Chandler, AZ (US); Ben-Zion Friedman, Jerusalem (IL)

(73) Assignee: Intel Corporation, Santa Clara, CA (US)

(*) Notice: Subject to any disclaimer, the term of this patent is extended or adjusted under 35 U.S.C. 154(b) by 273 days.

(21) Appl. No.: 14/580,766

(22) Filed: Dec. 23, 2014

(65) Prior Publication Data

US 2016/0182408 A1    Jun. 23, 2016

(51) Int. Cl.
*H04L 29/06* (2006.01)
*H04L 12/54* (2013.01)
*H04L 12/931* (2013.01)
*G06F 9/455* (2006.01)

(52) U.S. Cl.
CPC ...... *H04L 29/0653* (2013.01); *G06F 9/45558* (2013.01); *H04L 12/56* (2013.01); *H04L 49/70* (2013.01); *H04L 69/22* (2013.01); *G06F 2009/45595* (2013.01)

(58) Field of Classification Search
CPC ............... H04L 12/56; H04L 29/06095; H04L 29/0653; H04L 45/74; H04L 49/3009; H04L 49/309; H04L 69/22; H04L 69/24; H04L 29/06102
See application file for complete search history.

(56) References Cited

U.S. PATENT DOCUMENTS

2013/0132622 A1* 5/2013 Ajanovic .............. G06F 1/3203 710/105
2015/0009831 A1* 1/2015 Graf ........................ H04L 47/31 370/236

* cited by examiner

*Primary Examiner* — Ashley Shivers
(74) *Attorney, Agent, or Firm* — Schwegman Lundberg & Woessner, P.A.

(57) ABSTRACT

Devices and techniques for indicating packet processing hints are described herein. A device may receive a data packet. The device may extract a match-action attribute from the data packet that specifies an action to be applied to the data packet. The device may generate a hint field based on the match-action attribute. The hint field may include information to be used for handling the data packet. Other embodiments are also described.

20 Claims, 6 Drawing Sheets

DEVICE FOR INDICATING PACKET PROCESSING HINTS

TECHNICAL FIELD

Embodiments described generally herein relate to processing of data packets sent or received through a network. Some embodiments relate to hardware acceleration of data packet processing.

BACKGROUND

Top-of-rack switches and special function hardware provide network functions including packet switching, security, deep packet inspection, and other functions. Recently, there has been a trend to provide virtual switches and network functions executing on high-volume computer architectures. Ongoing efforts are directed to improving performance of virtual switches.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Some data centers use top-of-rack (ToR) switches and special function hardware to provide network functions including packet switching, security, deep packet inspection, and other functions. Recently, there has been a trend within data centers to provide virtual switches and network functions executing on high-volume computer architectures. Virtual switches process network traffic between a Network Interface Card (NIC) and virtual machines or other software. With steady increases in performance of NICs, virtual switches have become a performance bottleneck that can limit aggregate bandwidth delivered to virtual machines or other software.

Figure 1A:
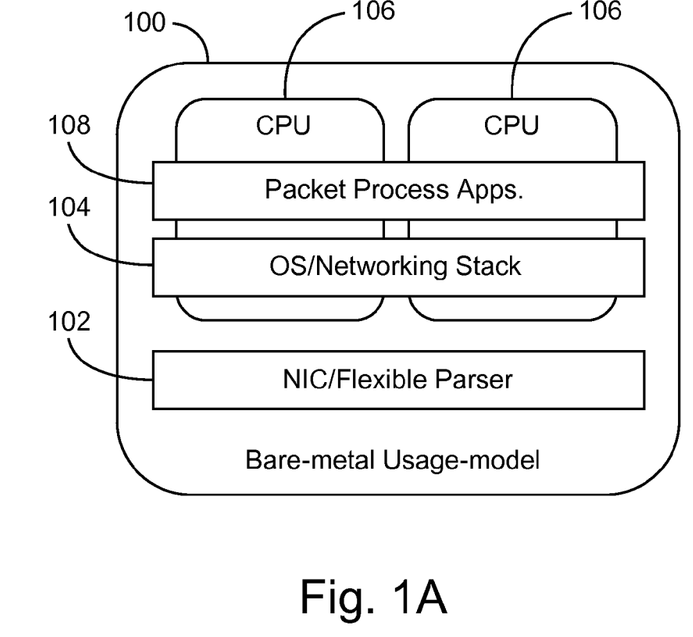
FIGS. 1A and 1B illustrate data packet processing usage models.
Figure 1B:
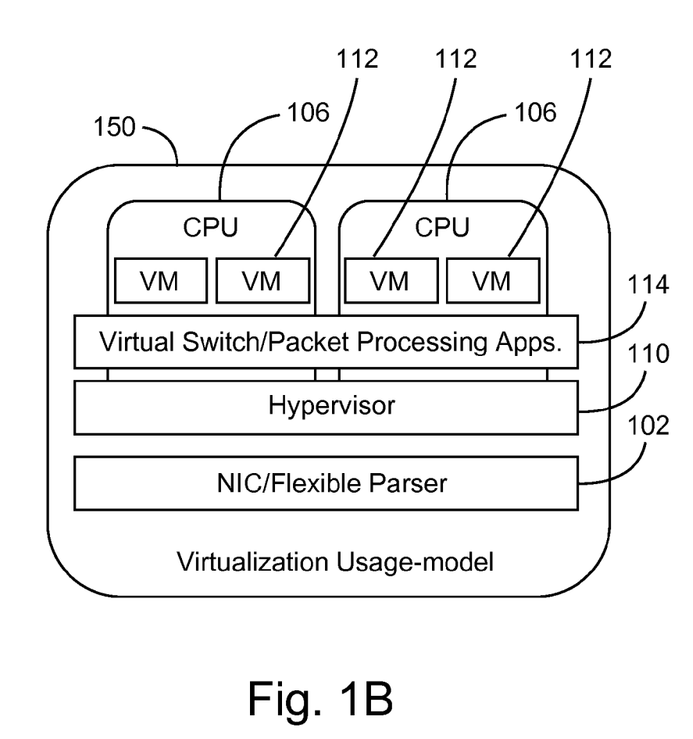

FIGS. 1A and 1B illustrate data packet processing usage models. According to one usage model shown in FIG. 1A, in a bare-metal system 100 (i.e., a system not using a hypervisor), NIC hardware 102 can ease performance bottlenecks by performing offloading of various processing tasks needed to process packets (e.g., "data packets"). For example, the NIC hardware 102 can perform checksum offloading, cyclic redundancy check (CRC) offloading, L3/L4 offloading, virtual local area network (VLAN) identifier stripping. The NIC hardware 102 will then provide the data packets to the host operating system (OS) or the network layer 104 of host CPUs 106, for further processing, having relieved the OS of some of the tasks of processing the data packets. Some providers also implement L2-L7 packet processing applications to extract various data packet fields, and perform other processing such as hash calculation on a data packet.

In a virtualization system 150 as shown in FIG. 1B, the NIC hardware 102 can perform similar functionalities as that described above with respect to FIG. 1A. A hypervisor 110 creates and runs virtual machines 112, wherein the virtual machines 112 execute on host CPUs 106 in the virtualization system 150 with packet processing performed by virtual switches or packet processing applications 114.

Embodiments provide hardware assist functionalities to enhance performance of virtual switches 114 and their network functions, and to relieve an OS executing on the host CPU 106 from various data packet processing duties. Furthermore, embodiments can help reduce overall memory bandwidth at the host by allowing only relevant data packet attributes to be stored in cache memory.

In embodiments, hardware, such as hardware of a NIC or external switch, provides hints to enhance data packet processing performance by a host system or systems. The hardware adds hints to data packets, for example in metadata of the data packets, to help accelerate the processing of these data packets by the receiver (e.g., host software) of the data packets to tell the software what processing has already been performed by the hardware.

In embodiments, rules for programming these hints can be added by host software, such as by the host operating system (OS) or by other packet processing software. The rules can specify how the hardware shall add hints based on match-action attributes in transmitted or received data packets. Embodiments further provide various ways for the hardware to indicate the metadata and hints to the software, after the hardware has processed data packets matching the programmed match-action attributes according to rules provided by the packet processing software.

Figure 2:
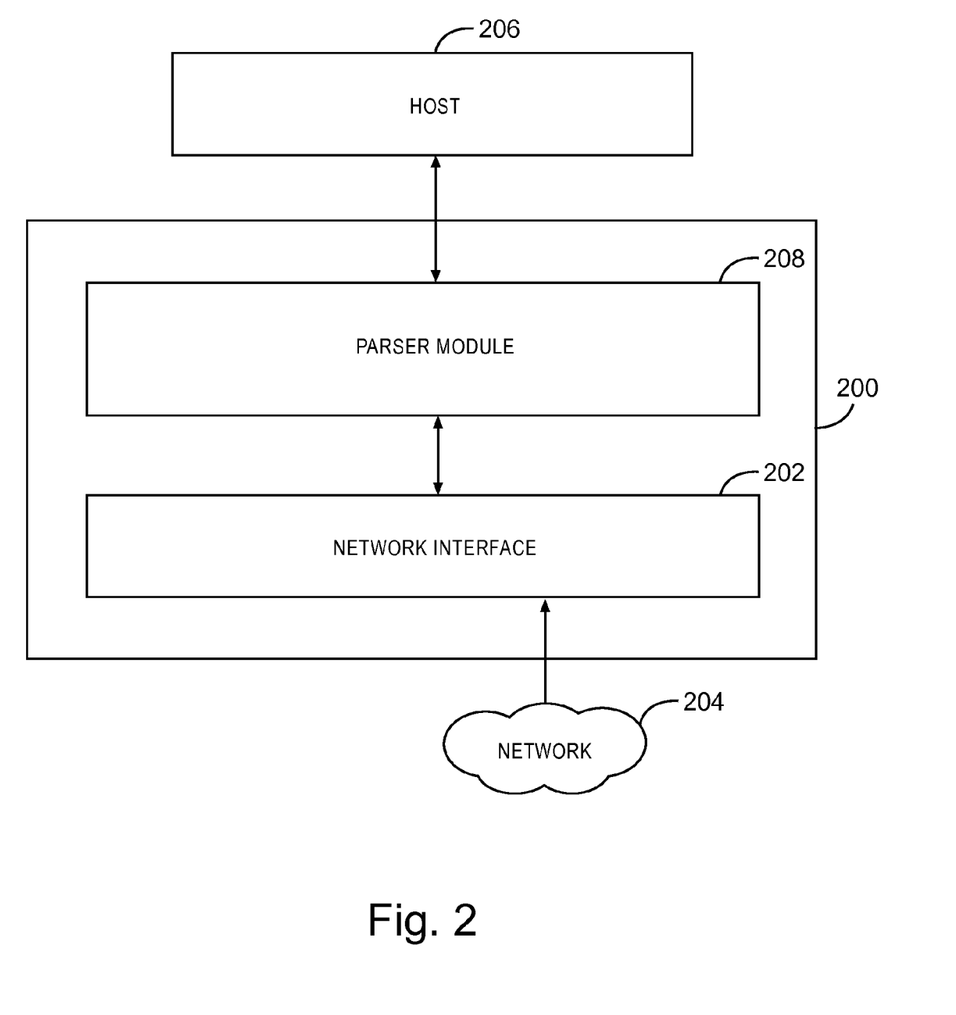
FIG. 2 illustrates a device in accordance with some embodiments.

FIG. 2 illustrates a device 200 in accordance with some embodiments. The device 200 will provide hints, described above, for hardware acceleration of data packet processing. The device 200 can include hardware circuitry of a NIC card, a hardware switch of a ToR system, etc. The device 200 can act as NIC hardware 102 (FIG. 1A or 1B). Some functionalities of the device 200 can be performed by a NIC driver (not shown in FIG. 2).

The device 200 includes a network interface 202 to receive data packets from the network 204. In some embodiments, the network interface 202 provides (e.g., transmits) data packets, received from the host 206 over the network 204 to other hosts, devices, switches, etc. in a data center fabric (not shown in FIG. 2).

The device 200 includes a parser module 208 to extract a match-action attribute from data packets, to generate hint fields based on the match-action attribute and to provide the hint field to an upper layer (e.g., the host 206 or software executing on the host 206) according to various methods as described with reference to FIG. 3.

Creating Hints Based on Matched-action Attributes

Figure 3:
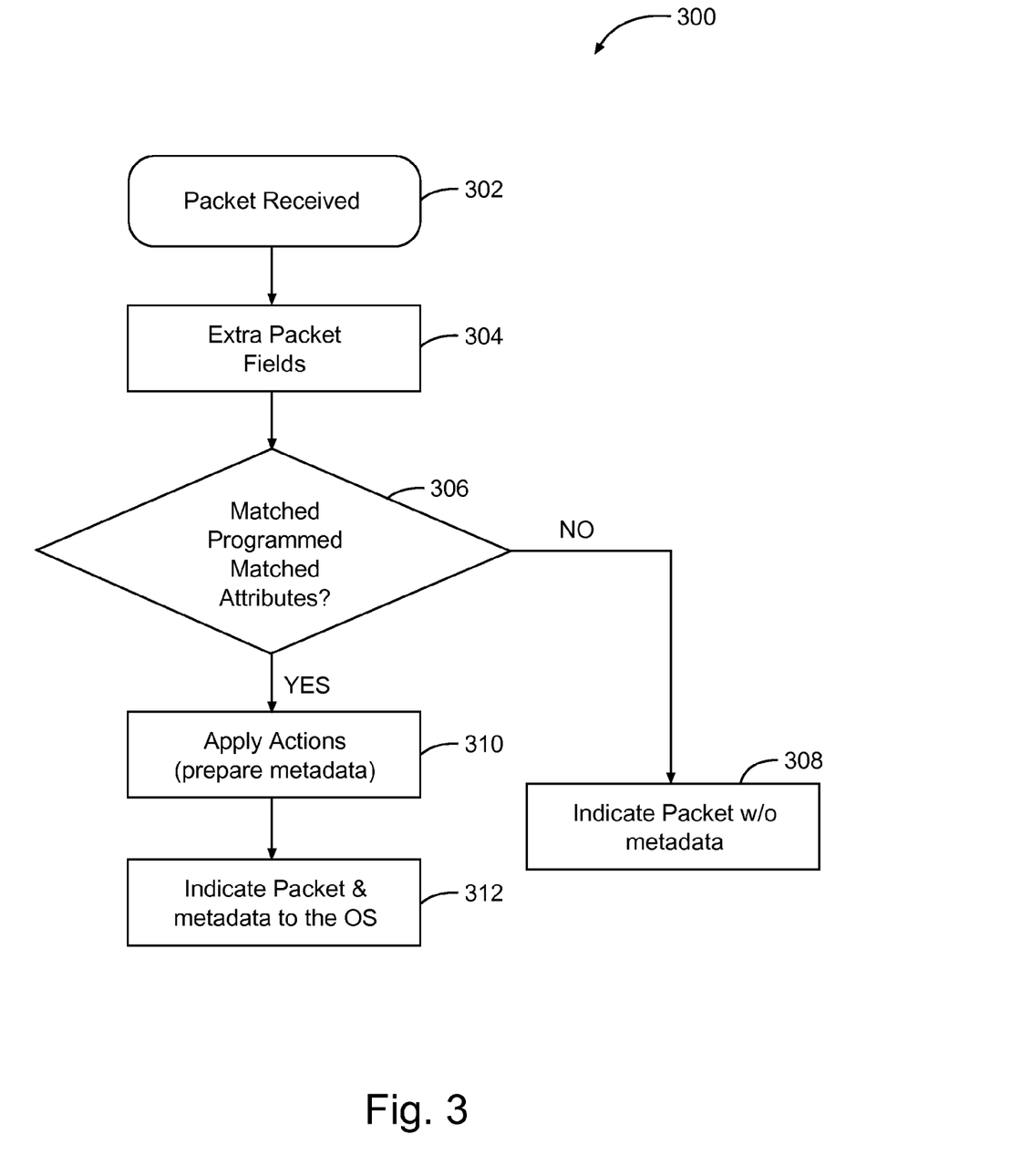
FIG. 3 illustrates a flow chart of an example hardware-implemented method in accordance with some embodiments.

FIG. 3 illustrates a flow chart of an example hardware-implemented method 300 in accordance with some embodiments. Some operations of example method 300 can be implemented by the device 200 (FIG. 2), based on rules provided by the host 206.

The example method 300 begins with operation 302 with the device 200 receiving a data packet. The data packet (e.g., a "receive data packet") can be received from other computers, users, or devices through, for example, a data center fabric, or the data packet (e.g., a "transmit data packet") can be received from the host 206 (FIG. 2) for the device 200 to transmit to other devices or network elements over the data center fabric.

The example method 300 continues with operation 304 with the device 200 extracting fields from the data packet. For example, the device 200 can extract an attribute from the data packet to be used in operation 306, below.

The example method 300 continues with operation 306, when the device 200 (e.g., the parser module 208 of the device 200) determines whether there are matched attributes in the data packet. Examples of attributes, and matching, are described in more detail later herein. If there are no matched attributes, in operation 308, the device 200 indicates (i.e., "transmits") the data packet to an upper layer (e.g., host 206 (FIG. 2) or software executing on the host 206) without further processing at the device 200.

In operation 310, if there are matched attributes in the data packet, the device 200 generates a hint field based on the match-action attribute and program this hint field into packet metadata.

Some hint fields according to some embodiments can indicate that the device 200 has already performed some processing on the data packet. For example, the hint can provide information that the device 200 has added additional bytes to the data packet. As an additional example, in some available systems, an OS executing on the host 206 will classify received data packets to identify packet types. In contrast, in accordance with some embodiments, the device 200 can perform pre-classification of data packets, and provide a hint field to indicate that other software does not need to perform at least this classification. The hint field can further instruct the host 206 as to what further operations should be performed using that data packet based on the classification. Such a hint field can help remove or mitigate bottlenecks and provide enhanced performance of data packet processing applications by removing some burdens related to data packet processing from upper-layer software applications.

The device 200 will receive a rule or set of rules from the host 206 or from software executing on the host 206. The device 200 will use these rules to add the above-described hint fields. For example, at least in embodiments in which the device 200 implements a tunnel endpoint, the host 206 can program the device 200 to include debugging information for debugging the data packet. For example, the rule can instruct the device 200 to add headers, which may or may not have been previously deleted, back into the data packets for debugging of data packets by the host 206. These deleted headers may include VLAN IDs, priority levels, tunnel headers, etc. On the other hand, the host 206 can program the device 200 to remove information that the host 206 considers to not be important to other recipients of data packets sent over the network 204.

In some embodiments, rules are based on IP addresses. In some embodiments, the rule can include an IP address corresponding to a source or destination of the data packet, for which the hint field is to be generated. For example, the rule can include an IP address corresponding to a machine with a wired or wireless network connection to the device 200, and the device 200 will then add the appropriate hint field to any data packet arriving from that machine. Tables 1 and 2 are some example rules based on IP addresses.

Table 1 illustrates a first example rule that can be received by the device 200 from the host 206:

TABLE 1

First example rule.

Src IP = x Dest IP = y, Dest Port = 80 Action: Indicate Metadata value = "abcd"

Based on the rule in Table 1, the device 200 would receive a data packet at operation 302, extract fields in operation 304, and then, in operation 306, the device 200 would match attributes Src IP=x, Dest IP=y, Dest Port=80. Upon matching these attributes, in operation 310, the device 200 would take the action of adding metadata value "abcd" to the data packet, where "abcd" is the hint field. The packet processing application 108 can use this metadata "abcd" to take a direct action on the corresponding data packet. For example, the packet processing application 108 can directly access packet data to apply policy while bypassing tasks such as, for example, L2-L7 field extraction, hash calculation, lookup, etc.

Table 2 illustrates a second example rule that can be received by the device 200 from the host 206:

TABLE 2

Second example rule.

Src IP = x Dest IP = y, Dest Port = 80 Action: Extract content from location zz in the packet and Indicate it as a metadata value= {hint}

Based on the rule in Table 2, the device 200 would receive a data packet at operation 302, extract fields in operation 304, and then, in operation 306, the device 200 would match attributes Src IP=x, Dest IP=y, Dest Port=80. Upon matching these attributes, in operation 310, the device 200 would take the specified action of extracting content of the packet data at location zz and indicating the content of the data packet at location zz in the data packet as a metadata hint to the software. For example, the "hint" field could contain packet data from location zz.

It will be appreciated that the rule in Table 1 includes a hard-coded hint "abcd" to be added to metadata upon matching the specified attribute whereas, in contrast, the rule of Table 2 programs the device 200 to retrieve data at a location zz in the pertinent data packet and add that data, which may not be known in advance and is therefore not hard-coded, as a hint in the metadata.

In some embodiments, the rule includes a list (e.g., a container) of IP addresses or a network domain name, wherein the container includes the source of the data packet for which the hint field is to be generated, and wherein the network domain name is the network domain name for the source of the data packet.

Table 3 is a third example rule, based on a container of IP addresses, that can be received by the device 200 from the host 206:

TABLE 3

Third example rule.

Src IP = (Container xx ID) Dest IP = (Container yy ID), Dest Port = 80 Action: Indicate metadata1 value = abcd and TABLE 3-continued Third example rule.

metadata2 value= (Container ID xx) and metadata3 value = (Container ID yy)

Based on the rule in Table 3, the device 200 would receive a data packet at operation 302, extract fields in operation 304, and then, in operation 306, the device 200 would detect matched attributes. The attributes in Table 3 include containers, which are a table of IP addresses, with container identifiers (IDs) xx and yy in the illustrated example of Table 3. If a data packet arrives with source and destination IP addresses that fall within Container xx and Container yy, respectively, in the illustrative example, the device 200 will perform a lookup in those container tables and provide one or both container IDs as hints within metadata to the host 206. By performing lookups in those two containers in accordance with a rule similar to that shown in Table 3, the device 200 can reduce the number of lookups that need to be performed in the host 206. Embodiments are not limited to any particular number of table lookups or other operations that can be performed, however.

With reference to Table 3, the device 200 can provide an "abcd" hint within metadata similar to that described earlier herein with respect to Table 1 to indicate an action that the host 206 should take. For example, the rule in Table 3 may specify that a hint "abcd" should be added to bar messages, such as e-mails, arriving from a particular network with a particular network domain name. Under that rule, the device 200 adds hint "abcd" to data packets arriving from machines in that network domain name to inform the host 206 that the host 206 is to ignore or otherwise refrain from processing that data packet.

In some embodiments, the hint field includes an IP address, corresponding to a source of the data packet for which the host 206 is to take an action in response to receiving the data packet.

Rules can also be based on matches of other fields in the data packets, besides IP address-based fields. For example, in some embodiments, the device 200 may look for a match of a specified text string. Embodiments are not limited to any particular matching or type of matching that the device 200 can undertake when applying actions based on matched attributes.

In some embodiments, the rules can instruct the device 200 to add hints communicating error conditions, such as dropped data packets, or to pass time stamps for latency measurements, etc. The rules can instruct the device 200 to provide information regarding differences (e.g., a "delta") between bytes in the data packet that actually got transmitted and bytes in the data packet that were originally intended to be transmitted.

As briefly mentioned earlier herein, in some embodiments, the device 200 can add hints to outgoing data packets (e.g., transmit data packets). The host 206 can provide rules for adding hint fields to outgoing data packets to be transmitted to another computing device. In least these embodiments, the rules can instruct the device 200 to add hints providing context information, which can be useful for TCP Segmentation Offloading (TSO) packets going through tunnel generations. This context information can also useful in various other contextx and in cases where a tunneled TCP connection is offloaded to the TCP Offload Engine (TOE).

In some embodiments, the rules can instruct the device 200 to tag data packets with information to provide packet transformation in descriptor write back operations. For example, in embodiments, the information may include outgoing packet size, outgoing Media Access Control (MAC) information or any other information that can enhance or expedite data transfer. In embodiments, this information can be used during descriptor write back, such that receiving devices do not need to wait for write back coalescing to occur. In some embodiments, the rules can instruct the device 200 to pass other information such as time before a flow table is filled up, or other statistics.

The hint field can include an index into a table such that a table element at the index includes information on an action to take in response to receiving the data packet. Such a table can be stored in a memory accessible by the host 206 or by an OS or network stack executing on the host 206, or by other software on the host 206 or any other machine or computing device.

Indicating Hints to the Host

Figure 4:
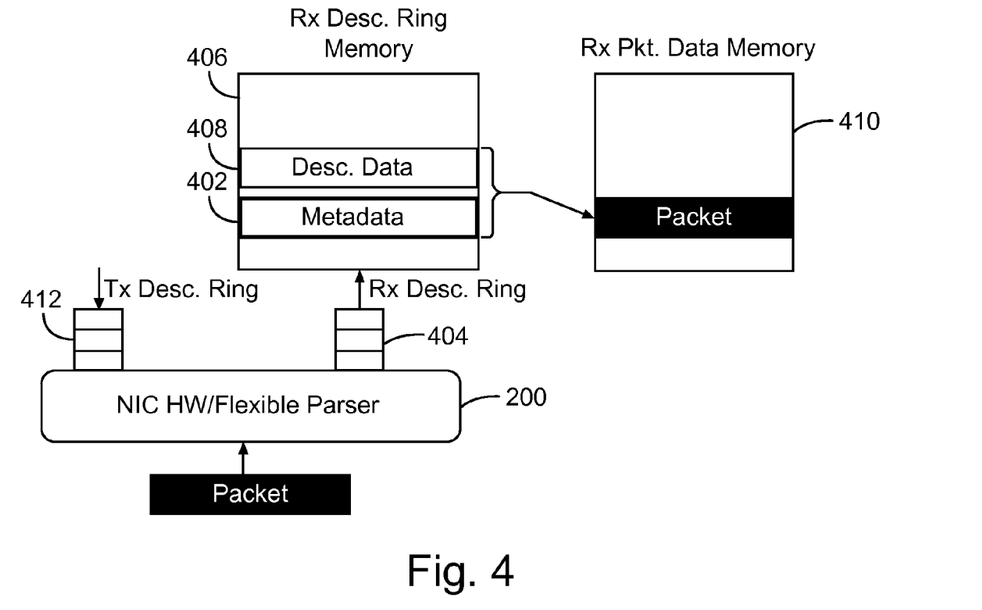
FIG. 4 illustrates out-of-band metadata signaling in accordance with some embodiments.
Figure 5:
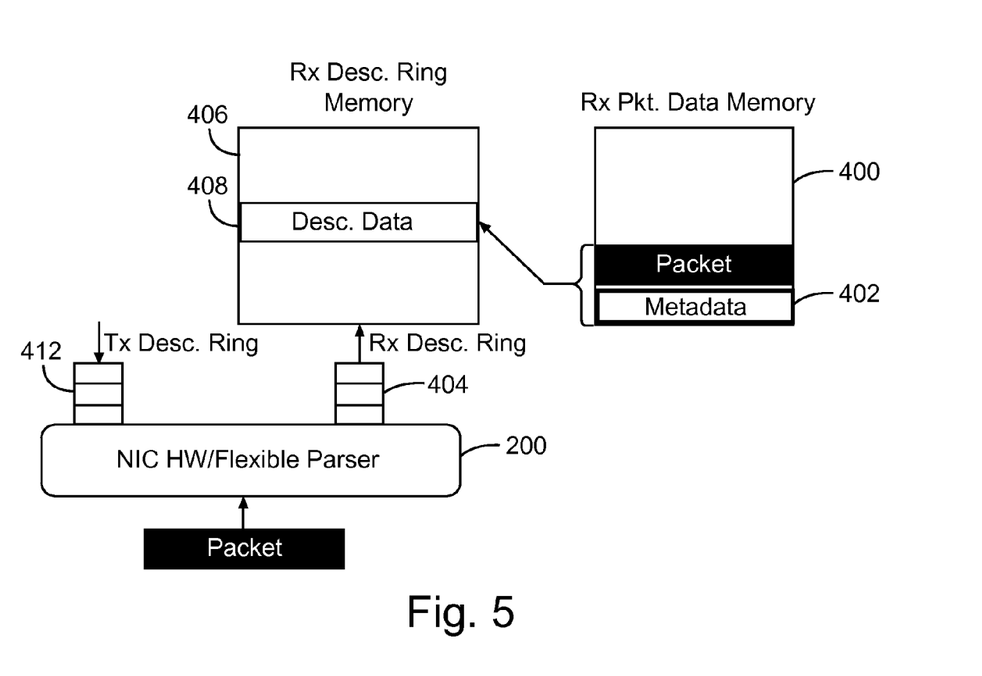
FIG. 5 illustrates in-band metadata signaling in accordance with some embodiments.

Referring again to FIG. 3, in operation 312, the device 200 transmits or otherwise indicates the hint field to make the hint field accessible by the host 206 so that software executing on the host 206 can determine what actions have already been taken on received data packets, to expedite processing of those data packets. The device can perform this transmission of operation 312 using out-of-band signaling or in-band signaling of metadata, wherein the metadata includes at least one hint field, although embodiments are not limited thereto. FIG. 4 illustrates out-of-band metadata signaling in accordance with some embodiments. FIG. 5 illustrates in-band metadata signaling in accordance with some embodiments.

Referring to FIG. 4, in out-of-band metadata signaling, the device 200 adds the hint field to metadata 402, and adds the metadata 402 (with the hint field) to a receive descriptor ring 404 to be accessed by the host 206. The receive descriptor ring memory 406 can include, in addition to the metadata 402, any other descriptor data 408. The data packet is buffered in a receive packet data memory 410 associated with the received data packet.

It will be appreciated that the device 200 can also access data packets (e.g., transmit data packets) in a transmit descriptor ring 412 at least somewhat similar to the receive descriptor ring 404, for transmission to other devices on a network other than the host 206.

Referring to FIG. 5, in in-band metadata signaling, in some embodiments, the device 200 adds the hint field to metadata 402, but updates the receive descriptor ring 404, accessed by the host 206, to point to the hint field(s) within the metadata 402. The device 200 transmits the data packet, including the hint field within metadata 402, to the upper layer (e.g., the host 206 or software executing on the host 206) for buffering in the receive packet data memory 410. In other embodiments, the device 200 will add a header (not shown in FIG. 5) to the data packet that includes a pointer to the hint field. The device 200 will then transmit the data packet, including the header and hint field, to the host 206 for buffering in the receive packet data memory 410.

Architectures in which Embodiments can be Implemented

Figure 6A:
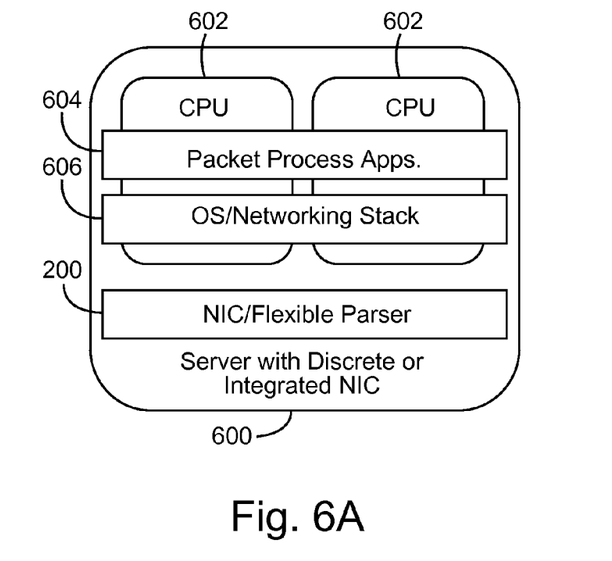
FIGS. 6A and 6B illustrate example system architectures in which some embodiments can be implemented.
Figure 6B:
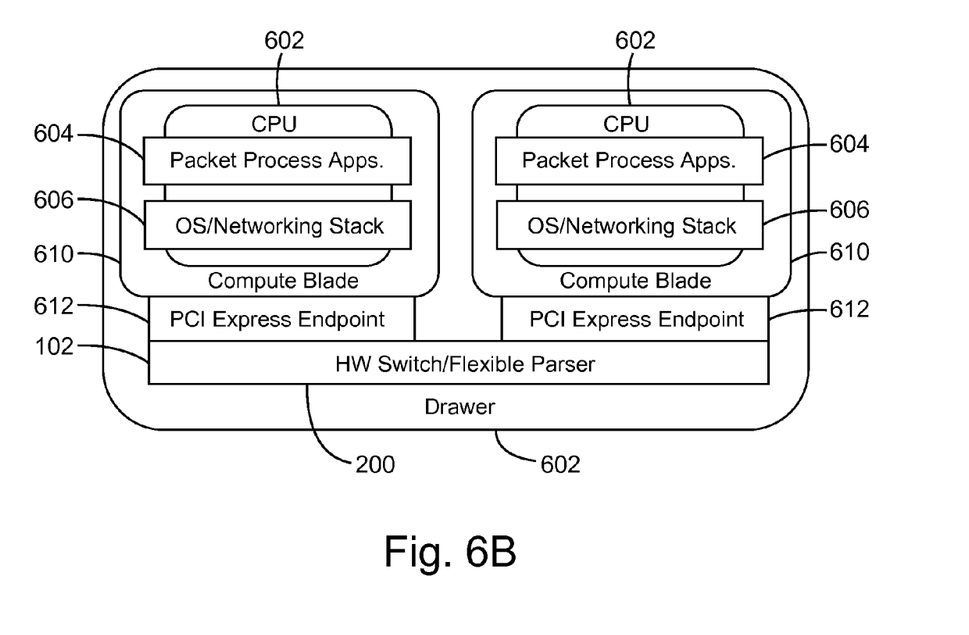

FIGS. 6A and 6B illustrate example system architectures in which some embodiments can be implemented. In one architecture shown in FIG. 6A, the device 200 can execute on a stand-alone computer or other machine 600 having one or more CPUs 602. Packet processing applications 604 such as firewalls, virtual switches, and an OS 606 or networking stack can execute on the CPUs 602. Additionally, the architecture of FIG. 6A can include multiple machines 600 that can be stacked and networked through a data center fabric (not shown in FIG. 6A) to receive hardware acceleration through the device 200. The device 200 in the architecture of FIG. 6A can include an external switch or NIC, although embodiments are not limited thereto.

In another architecture shown in FIG. 6B, the device 200 can run on data center hardware such as a system of compute blades 610 having one or more CPUs 602. Packet processing applications 604 such as firewalls, virtual switches, and an OS 606 or networking stack can execute on the CPUs 602. The compute blades 610 can be mounted in racks (not shown in FIG. 6B). The racks with compute blades 610 can be connected through a data center fabric (not shown in FIG. 6B) to receive hardware acceleration through the device 200.

The Peripheral Component Interconnect Express (PCIe) endpoints 612 can be directly presented to the CPUs 602 by the device 200. In some embodiments, the device 200 will include an external switch connected to the CPUs 602 through, for example, an Ethernet link.

Figure 7:
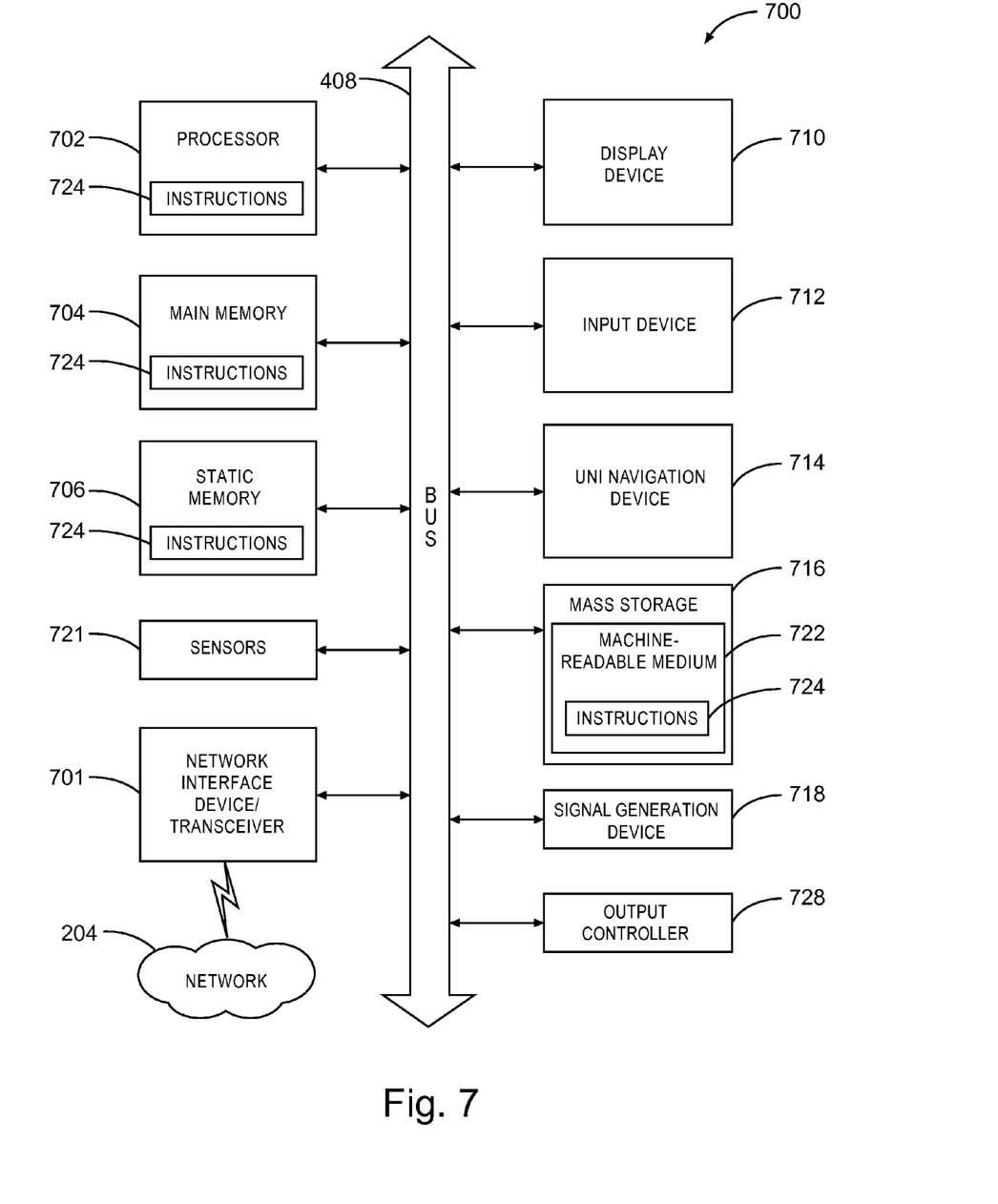
FIG. 7 illustrates a block diagram of an example of a machine that may be used to implement various mechanisms and techniques described herein.

FIG. 7 illustrates a block diagram of an example machine 700 that may be used to implement various mechanisms and techniques described herein. In some embodiments, the machine 700 may include one or more elements of the architectures shown in FIGS. 1A, 1B, 6A or 6B. The machine 700 can be networked to other machines in a network although embodiments are not limited thereto. Network interface device 701 may include most or all components of the device 200 (FIG. 2) for communicating with the network 202.

The machine 700 may operate in the capacity of a server machine and/or a client machine in server-client network environments. In an example, the machine 700 may act as a peer machine in peer-to-peer (P2P) (or other distributed) network environment. The machine 700 may be a personal computer (PC), a tablet PC, a set-top box (STB), a Personal Digital Assistant (PDA), a mobile telephone, a web appliance, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 702 may be configured by firmware or software (e.g., instructions, an application portion, or an application) as a module that operates to perform specified operations. In an example, the software may reside on at least one machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 702 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 700 may include a hardware processor 702 (e.g., a central processing unit (CPU), a graphics processing unit (GPU), a hardware processor core, or any combination thereof), a main memory 704 and a static memory 706, at least some of which may communicate with others via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, alphanumeric input device 712 and UI navigation device 714 may be a touch screen display. The machine 700 may additionally include a storage device (e.g., drive unit) 716, a signal generation device 718 (e.g., a speaker), and one or more sensors 721 such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR)) connection to communicate or control one or more peripheral devices (e.g., a printer, card reader, etc.).

The storage device 716 may include at least one machine-readable medium 722 on which is stored one or more sets of data structures or instructions 724 (e.g., software) embodying or utilized by any one or more of the techniques or functions described herein. The instructions 724 may also reside, at least partially, in additional machine-readable memories such as on the network interface device 701, main memory 704, static memory 706, or within the hardware processor 702 during execution thereof by the machine 700. In an example, one or any combination of the hardware processor 702, the main memory 704, the static memory 706, or the storage device 716 may constitute machine-readable media.

While the machine-readable medium 722 is illustrated as a single medium, the term "machine-readable medium" may include a single medium or multiple media (e.g., a centralized or distributed database, and/or associated caches and servers) that configured to store the one or more instructions 724.

For example, the instructions 724 can cause the machine 700 to provide rules to hardware circuitry (e.g., device 200 (FIG. 2) or the network interface device 701) for adding hint fields to data packets, based on match-action attributes within the data packets, wherein match-action attributes specify an action to be applied to data packets that include the respective match-action attribute. As described earlier herein, the rules can include at least one rule for adding a hint field to outgoing data packets to be transmitted to another machine.

The term "machine-readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 701 utilizing any one of a number of transfer protocols (e.g., frame relay, internet protocol (IP), TCP, user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the network interface device 701 (and the device 200 (FIG. 2)) may include one or more physical jacks (e.g., Ethernet, coaxial, or phone jacks) or one or more antennas to connect to the network 202. In an example, the device 701 (and the device 200 (FIG. 2)) may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

Additional Notes & Examples

Example 1 includes subject matter including a hardware-implemented for data processing (e.g., packet processing), the method comprising receiving a data packet; extracting a match-action attribute from the data packet that specifies an action to be applied to the data packet; and generating a hint field based on the match-action attribute, the hint field including information regarding an action to be taken in response to receiving the data packet.

In Example 2, the subject matter of Example 1 may optionally include receiving a rule from an upper layer for adding the hint field based on the match-action attribute.

In Example 3, the subject matter of any of Examples 1-2 may optionally including providing the hint field, wherein providing the hint field includes adding the hint field as a metadata field of the data packet; and providing the data packet, including the hint field, to the upper layer.

In Example 4, the subject matter of any of Examples 1-3 may optionally include updating a receive descriptor ring accessed by the upper layer, to point to the hint field.

In Example 5, the subject matter of any of Examples 1-2 may optionally include providing the hint field, wherein providing the hint field includes adding a header to the data packet that includes a pointer to the hint field; adding the hint field to the data packet; and providing the data packet, including the header and the hint field, to the upper layer.

In Example 6, the subject matter of any of Examples 1-2 may optionally include providing the hint field, wherein providing the hint field includes adding the hint field to a receive descriptor ring to be accessed by the upper layer.

In Example 7, the subject matter of any of Examples 1-2 can optionally include wherein the rule includes an IP address corresponding to a source of the data packet, for which the hint field is to be generated.

In Example 8, the subject matter of any of Examples 1-2 and 7 can optionally include wherein the rule includes a list of IP addresses or a network domain name indicating sources of the data packet for which the hint field is to be generated.

In Example 9, the subject matter of Example 2 can optionally include wherein the rule includes a rule for adding the hint field to outgoing data packets to be transmitted to another computing device, and wherein the method further includes transmitting the hint field to another computing device.

In Example 10, the subject matter of Example 9 can optionally include wherein the hint field includes context information for the outgoing data packets.

In Example 11, the subject matter of any of Examples 1-10 can optionally include wherein the hint field includes an index into a table stored in a memory, such that a table element at the index includes information on the action to take in response to receiving the data packet.

In Example 12, the subject matter of any of Examples 1-11 can optionally include wherein the hint field includes an IP address, corresponding to a source of the data packet for which the upper layer is to take the action in response to receiving the data packet.

In Example 13, the subject matter of any of Examples 1-12 can optionally include wherein the hint field includes debugging information for debugging the data packet.

Example 14 include subject matter (such as a network interface card, packet processing hardware, packet processing drivers, packet parsers, and or any other electrical apparatus or processor) including a network interface to receive a data packet; and a parser module to extract a match-action attribute from the data packet that specifies an action to be applied to the data packet; generate a hint field based on the match-action attribute, the hint field including information to be used for handling the data packet; add the hint field as a metadata field of the data packet; and provide the hint field to the upper layer.

In Example 15, the subject matter of Example 14 can optionally include wherein the device is further to receive a rule from the upper layer for adding the hint field based on the match-action attribute.

In Example 16, the subject matter of Example 15 can optionally include wherein the rule includes a rule for adding the hint field to outgoing data packets to be transmitted to another computing device, and wherein the network interface is further to transmit the hint field to another computing device.

In Example 17, the subject matter of any of Examples 14-16 can optionally include wherein the device includes memory and wherein the parser module provides the hint field to the upper layer by adding the hint field as a metadata field of the data packet; updating a receive descriptor ring of the memory, accessed by the upper layer, to point to the hint field; and transmitting the data packet, including the hint field, to the upper layer.

In Example 18, the subject matter of any of Examples 14-17 can optionally include wherein the device includes a network interface card (NIC).

In Example 19, the subject matter of any of Examples 14-18 can optionally include wherein the device includes an external switch of a top-of-rack (ToR) system.

Example 20 includes subject matter such as a machine-readable medium including instructions that, when executed on a machine (such as a computing device, a compute blade, a processor, or other electrical or electronic apparatus) including providing a plurality of rules to hardware circuitry for adding hint fields to data packets, based on match-action attributes within the data packets, wherein match-action attributes specify an action to be applied to data packets that include the respective match-action attribute.

In Example 21, the subject matter of Example 20 can optionally include wherein at least one rule of the plurality of rules includes a rule for adding a hint field to outgoing data packets to be transmitted to another machine.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A hardware-implemented method for packet processing, the method comprising:
   receiving a data packet;
   extracting a match-action attribute from the data packet that specifies an action to be applied to the data packet;
   receiving a rule from an upper layer for adding a hint field based on the match-action attribute; and
   generating the hint field based on the match-action attribute, the hint field including information regarding an action to be taken in response to receiving the data packet.

2. The method of claim 1, further comprising providing the hint field, wherein providing the hint field includes:
   adding the hint field as a metadata field of the data packet; and
   providing the data packet, including the hint field, to the upper layer.

3. The method of claim 2, further comprising:
   updating a receive descriptor ring, accessed by the upper layer, to point to the hint field.

4. The method of claim 1, further comprising providing the hint field, wherein providing the hint field includes:
   adding a header to the data packet that includes a pointer to the hint field;
   adding the hint field to the data packet; and
   providing the data packet, including the header and the hint field, to the upper layer.

5. The method of claim 1, further comprising providing the hint field, wherein providing the hint field includes:
   adding the hint field to a memory to be accessed by the upper layer.

6. The method of claim 1, wherein the rule includes an IP address corresponding to a source of the data packet, for which the hint field is to be generated.

7. The method of claim 6, wherein the rule includes a list of IP addresses or a network domain name indicating sources of the data packet for which the hint field is to be generated.

8. The method of claim 1, wherein the rule includes a rule for adding the hint field to outgoing data packets to be transmitted to another computing device, and wherein the method further includes transmitting the hint field to another computing device.

9. The method of claim 8, wherein the hint field includes context information for the outgoing data packets.

10. The method of claim 1, wherein the hint field includes an index into a table stored in a memory, such that a table element at the index includes information on the action to take in response to receiving the data packet.

11. The method of claim 1, wherein the hint field includes an IP address, corresponding to a source of the data packet for which a component of an upper layer is to take the action in response to receiving the data packet.

12. The method of claim 1, wherein the hint field includes debugging information for debugging the data packet.

13. A device comprising:
a network interface to receive a data packet; and
a parser module to
extract a match-action attribute from the data packet that specifies an action to be applied to the data packet;
generate a hint field based on the match-action attribute, the hint field including information to be used for handling the data packet;
add the hint field as a metadata field of the data packet; and
provide the hint field to an upper layer.

14. The device of claim 13, wherein the device is further to receive a rule from the upper layer for adding the hint field based on the match-action attribute.

15. The device of claim 14, wherein the rule includes a rule for adding the hint field to outgoing data packets to be transmitted to another computing device, and wherein the network interface is further to transmit the hint field to another computing device.

16. The device of claim 13, wherein the device includes memory and wherein the parser module provides the hint field to the upper layer by:
adding the hint field as a metadata field of the data packet;
updating a receive descriptor ring of the memory, accessed by the upper layer, to point to the hint field; and
transmitting the data packet, including the hint field, to the upper layer.

17. The device of claim 13, wherein the device includes a network interface card (NIC).

18. The device of claim 13, wherein the device includes an external switch of a top-of-rack (ToR) system.

19. A non-transitory machine-readable medium including instructions that, when executed on a machine cause the machine to perform operations including:
providing a plurality of rules to hardware circuitry for adding hint fields to data packets, based on match-action attributes within the data packets, wherein match-action attributes specify an action to be applied to data packets that include the respective match-action attribute;
adding the hint fields as metadata fields of the data packet; and
providing the data packet, including the hint field, to another machine.

20. The non-transitory machine-readable medium of claim 19, wherein at least one rule of the plurality of rules includes a rule for adding a hint field to outgoing data packets to be transmitted to the another machine.

* * * * *